US 9,743,589 B2

(12) United States Patent
Kelderman (10) Patent No.: US 9,743,589 B2
(45) Date of Patent: Aug. 29, 2017

(54) BALE STACKER AND METHOD OF USING SAME

(71) Applicant: Gary L. Kelderman, Oskaloosa, IA (US)

(72) Inventor: Gary L. Kelderman, Oskaloosa, IA (US)

(*) Notice: Subject to any disclaimer, the term of this patent is extended or adjusted under 35 U.S.C. 154(b) by 5 days.

(21) Appl. No.: 14/795,250

(22) Filed: Jul. 9, 2015

(65) Prior Publication Data

US 2016/0060049 A1   Mar. 3, 2016

Related U.S. Application Data

(60) Provisional application No. 62/043,243, filed on Aug. 28, 2014.

(51) Int. Cl.
*A01D 90/02* (2006.01)
*A01D 85/00* (2006.01)

(52) U.S. Cl.
CPC ........... *A01D 85/005* (2013.01); *A01D 90/02* (2013.01); *A01D 2085/007* (2013.01)

(58) Field of Classification Search
CPC ........... A01D 85/005; A01D 2085/007; A01D 90/08; A01D 2085/008; A01D 85/002; A01D 87/12; A01F 15/0875
USPC ............... 187/253; 414/111, 24.5, 24.6, 495, 414/789.7, 795.3; 56/10.2 F, 14.9, 15.4, 56/341, 473.5
See application file for complete search history.

(56) References Cited

U.S. PATENT DOCUMENTS

| | | | | | |
|---|---|---|---|---|---|
| 2,822,659 A | * | 2/1958 | Moore | ................. | A01D 85/005 198/367 |
| RE25,750 E | * | 3/1965 | Stroup | ................. | A01D 85/005 414/111 |
| 3,261,482 A | * | 7/1966 | Tate | .................... | A01D 85/005 414/789.2 |
| 3,367,518 A | * | 2/1968 | Bishop | ................. | A01D 85/005 414/789.7 |
| RE26,478 E | * | 10/1968 | Stroup | .................. | A01D 90/08 414/789.7 |
| 3,549,023 A | * | 12/1970 | Backman | ............... | A01D 90/08 414/789.4 |
| 3,618,791 A | * | 11/1971 | Potter | .................. | B65G 57/302 414/791.9 |
| 3,623,743 A | * | 11/1971 | Rohrer | ..................... | B60P 1/56 280/103 |
| 4,123,081 A | * | 10/1978 | Ellinger | ................. | B60D 1/167 280/463 |

(Continued)

FOREIGN PATENT DOCUMENTS

| | | | | |
|---|---|---|---|---|
| DE | 2658082 A1 | * | 7/1978 | ........... A01D 85/002 |
| DE | 3737969 C2 | * | 11/1992 | ........... A01D 85/005 |

(Continued)

OTHER PUBLICATIONS

Hesston—by Massey Fersugon—2100 Series Large Square Balers—26 pages.

(Continued)

*Primary Examiner* — Gregory Adams (57) ABSTRACT

A method of and apparatus for producing stacks of large square bales. Bales are received from the baler via a bale accumulator and formed into a stack, a plurality of bales high. The resulting bale stacks may be dropped in the field for pickup later.

16 Claims, 9 Drawing Sheets

(56) References Cited

U.S. PATENT DOCUMENTS

| | | | | |
|---|---|---|---|---|
| 4,273,488 | A * | 6/1981 | Hill | A01D 90/08 414/497 |
| 4,433,533 | A * | 2/1984 | Giani | A01F 15/0833 100/99 |
| 4,642,014 | A * | 2/1987 | Saarinen | A01G 9/088 193/35 SS |
| 4,730,974 | A * | 3/1988 | Andre | B60P 3/07 14/72.5 |
| 5,975,552 | A * | 11/1999 | Slaton | B60D 1/38 280/478.1 |
| 8,028,784 | B1 * | 10/2011 | Van Ginkel | B60P 1/435 180/209 |
| 8,408,857 | B2 | 4/2013 | Kelderman | |
| 2011/0318150 | A1 * | 12/2011 | Kelderman | A01D 85/005 414/518 |
| 2012/0045310 | A1 | 2/2012 | Kelderman | |
| 2013/0315694 | A1 | 11/2013 | Kelderman | |

FOREIGN PATENT DOCUMENTS

| | | | | |
|---|---|---|---|---|
| DE | WO 9724920 | A2 * | 7/1997 | A01D 85/005 |
| ES | EP 1222850 | A1 * | 7/2002 | A01D 85/002 |
| FR | WO 9622010 | A1 * | 7/1996 | A01D 85/00 |
| GB | 1378176 | A * | 12/1974 | A01D 85/005 |
| GB | 2258628 | A * | 2/1993 | A01D 85/005 |
| NL | WO 2008147177 | A1 * | 12/2008 | A01D 85/005 |

OTHER PUBLICATIONS

Innovative Products by PhiBer—Bale Accumulators—2 pages.
Quadro PAC V—Square Bale Accumulator and Stacker—2 pages.

* cited by examiner

BALE STACKER AND METHOD OF USING SAME

RELATED APPLICATION

Priority is hereby claimed to U.S. Provisional Patent No. 62/043,243 to Kelderman, filed Aug. 28, 2014 to a six pack stacker and method of using same, which describes the present invention and is hereby incorporated by reference in its entirety.

TECHNICAL FIELD

This invention relates generally to a device for delivering large square bales from an accumulator attached to a baler, moving the bales to a stacking machine to configure the bales into a stack at least two bales wide and at least two bales high.

BACKGROUND

U.S. Pat. No. 8,408,857 to a Bale Picking Truck by Kelderman shows a method and apparatus for quickly and efficiently picking up and removing biomass bales from a field in which the biomass was baled, compactly stacking the bales after picking the bales off the ground and efficiently depositing the bales on the ground at a staging area for later loading onto a semi trailer, straight truck, or train car, which application is incorporated herein by reference in its entirety.

Published U.S. Patent Application No. 2012/0045310 to a Bale De-Stacker by Kelderman relates to a method and apparatus for efficiently unstacking square bales from a stack and conveying the square bales in small sets or individually once they arrive from their aforementioned staging area to the place that they are to be used, such as in an ethanol production plant or a plant where the bales are to be burned for fuel.

Published U.S. Patent Application No. 2013/0315694 to Kelderman relates to a bale loading trailer and method of using it, specifically to loading and unloading stacks of six bales into or out of a trailer. U.S. patent application Ser. No. 14/326,149 to Kelderman shows a similar device to load or unload stacks of six bales into or out from a trailer that uses a center drive loader for a bale trailer. All the aforementioned patent documents are incorporated herein by reference in their entirety.

It is believed that a device for forming stacks of bales for use with the aforementioned equipment, a device to efficiently receive bales directly from a bale accumulator and form those bales into a stack of bales at least two bales wide and at least two bales high would be extremely useful but has heretofore never been contemplated or designed.

Accordingly, there is a need for a method and apparatus to efficiently load the bales directly from a baler accumulator to a bale stacker and form a stack at least two bales wide and at least two bales high.

SUMMARY OF THE INVENTION

Biomass is frequently formed into large bales of roughly rectangular parallelepiped shape. These are typically referred to by those having skill in this art as "large square bales," or "big square bales," and these terms will be used herein. Therefore, for the purposes of the instant document, including the claims, the synonymous terms, "large square bales," and "big square bales," are defined as bales of biomass, roughly shaped in rectangular parallelepiped shape. Typical large square bales run over 700 pounds and are bound with baling twine. The dimensions of these bales vary based on the needs of those involved in baling, storing, or feeding the bales. Although the present invention is not limited to a particular sized bale, ideal dimensions of the bale stacker of the present invention will be based on bale size.

Biomass is mowed in the fields in which it is grown, permitted to dry, windrowed, and baled. A bale accumulator associated with the baler may accept bales from the baler and organize them in a single layer, typically two or three bales wide.

The present invention is intended to trail behind the bale accumulator and accept bales from the bale accumulator. The bale stacker of the present invention creates a stack of a plurality of big square bales, convenient for loading onto another mode of conveyance. Multiple stacks may, for instance, be loaded onto the Bale Picking Truck of U.S. Pat. No. 8,408,857, or into the bale loading trailer of U.S. Published Patent Application No. 2013/0315694 or U.S. patent application Ser. No. 14/326,149.

An object of the present invention is to automatically create a stack of a plurality of large square bales.

Another object of this invention is to receive bales from bale accumulators accumulating bales either two or three bales wide.

DESCRIPTION OF THE DRAWINGS

The above mentioned need is at least partially solved through provision of the method and apparatus described in the following detailed description, particularly when studied in conjunction with the drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Referring now to the drawings, wherein like reference numerals indicate identical or similar parts throughout the several views, FIGS. 1-23 show a preferred embodiment of the present invention.

Figure 1:
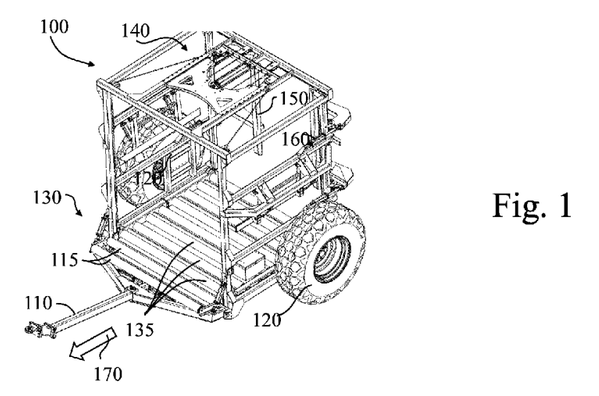
FIG. 1 shows the bale stacker of the present invention in perspective.

Referring now to FIG. 1, the large square bale stacker 100 is shown in perspective view. The tongue 110 is used to draw the bale stacker 100 behind a baler equipped with a bale accumulator, as well as behind any source of motive power. A plurality of ground engaging wheels 120 support the stacker 100 and its load. A roller bed 130, having a plurality of rollers 135, provides a surface onto which large square bales 400 (see, for instance, FIG. 4a) are slid in organized fashion. Transition rollers 115 are attached to the tongue 110 and aid in transferring bales 400 into the bale stacker 100 irrespective of the tongue's 110 position. A cable lift mechanism 140 is used to raise bales 400 to make room for more bales 400 below. Gates 150, opened and closed by hydraulic cylinders 160, hold the bales 400 in place until an unloading operation is initiated.

The following terms are hereby defined for the purposes of this document, including the claims. An arrow 170 indicates a forward direction. This is the direction of travel when the bale stacker 100 is in use. Front is forward-most when the bale stacker 100 is pulled in its forward direction. Back or rear is opposite that of the front and behind is defined as in back of or rear of something. Left is defined as the left side when viewed from the rear, that is, when an observer is facing in the forward direction. Right is defined as the right side when viewed from the rear, that is, when an observer is facing in the forward direction. Up or upward is a direction opposing gravity, while down or downward is opposite that of up. In particular, the verb, raise, implies movement in the upward direction while the verb, lower, implies movement in the downward direction. All these terms all have their usual and customary meanings.

Figure 2A:
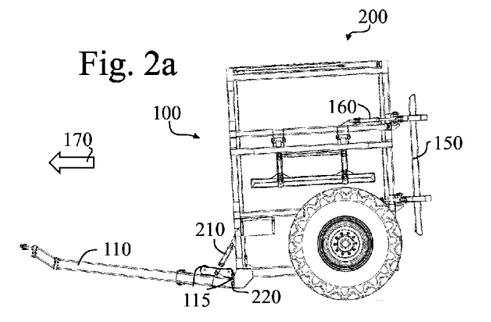
FIGS. 2a and 2b illustrate how the bale stacker mechanism pivots on a horizontal axis of pivot relative to a tongue.
Figure 2B:
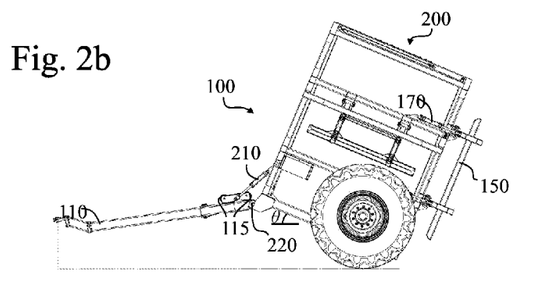

FIGS. 2a and 2b depict the adjustable angle, θ, of the bale stacking mechanism 200. The bale stacking mechanism 200 is pivotable about a pin 220 defining a substantially horizontal axis 340 (see FIG. 3a) by virtue of the hydraulic cylinders 210. The adjustment of the angle, θ, of the bale stacking mechanism 200 allows the bale stacker 100 to be pulled behind baler accumulators (not shown) of varying heights. By adjusting the angle, θ, bales 400 may transition smoothly from the baler into the bale stacker 100.

Figure 3A:
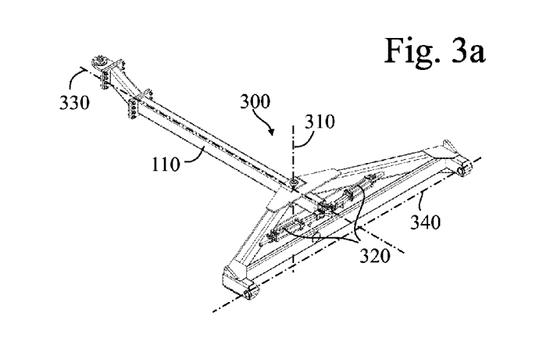
FIGS. 3a-3c illustrate a tongue of the bale stacker, and show a pivoting of the tongue on a vertical axis of pivot relative to the bale stacking mechanism.
Figure 3B:
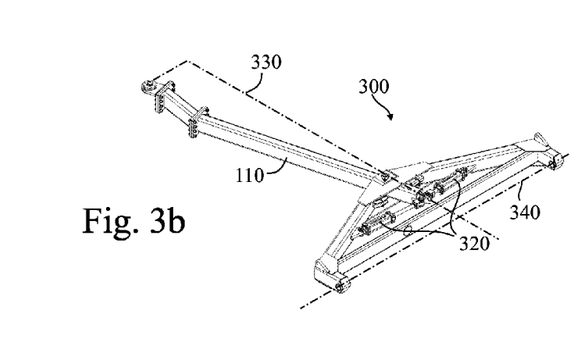
Figure 3C:
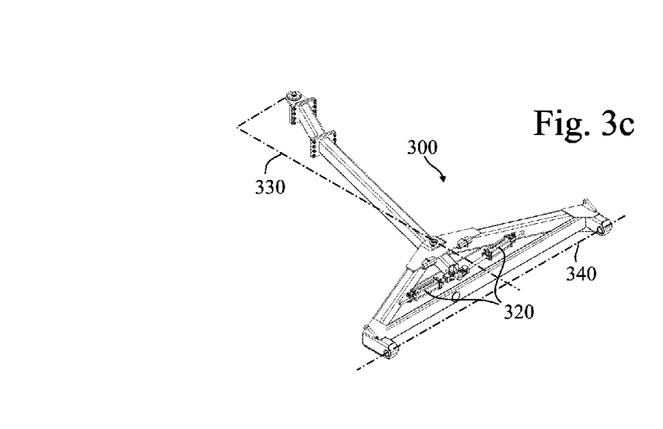
Figure 4A:
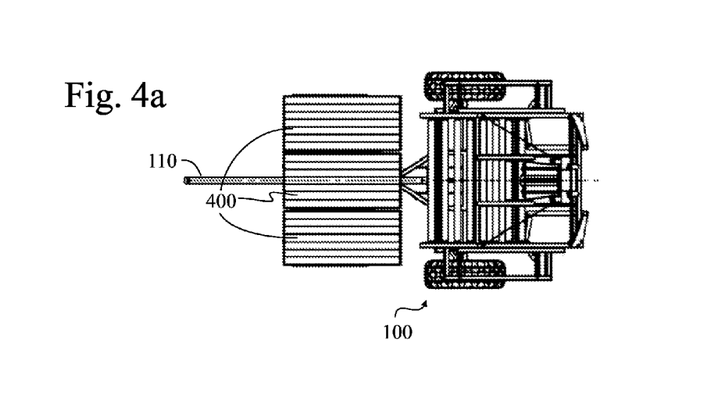
FIGS. 4a through 4c show the bale stacker in plan view, and illustrate how bales from a bale accumulator, accumulating bales three-wide, are accommodated by pivoting the stacking mechanism relative to the tongue on a vertical axis of pivot.
Figure 4B:
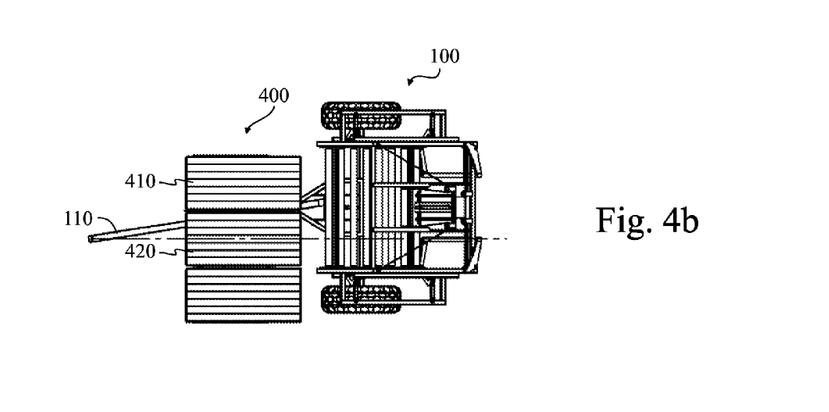
Figure 4C:
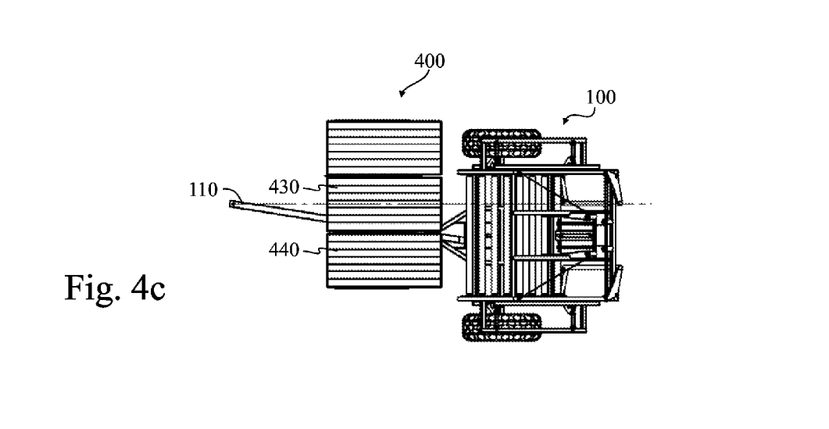

The frame 300 for the bale stacker 100 features an adjustable position tongue 110 as shown in FIGS. 3a-3c. The adjustable hitch makes it possible to pull the bale stacker 100 behind a baler utilizing either a two- or three-bale accumulator. This is because the bale stacker mechanism 200 may be laterally positioned directly behind any set—for instance, a pair—of bales 400 to be transferred from the bale accumulator to the bale stacker 100 as shown in FIGS. 4a-4c.

Lateral positioning is effected by pivoting the tongue 110 about a substantially vertical axis 310 through the actuation of a pair of hydraulic cylinders 320. Note that, here as well as elsewhere in this document, a hydraulic cylinder may be replaced by a pneumatic cylinder, linear electric actuator, screw actuator, etc. The present invention is not limited to hydraulic cylinders.

By actuating the cylinders 320, the tongue 110 is offset, angularly, from a longitudinal axis 330. The tongue 110 may be shifted left, as shown in FIG. 3b, or right, as shown in FIG. 3c, both from a perspective from the rear of the bale stacker 110.

The right and left offsets of the tongue 110 are greater than a minimum required to align with the bales 400 as they are received from the bale accumulator. This is so an operator can adjust how the bale stacker 100 trails the baler and the bale accumulator on a side-hill and when turning. Position sensors may be placed on the tongue 110 and programmed to follow the motions of the baler to maintain optimal alignment with the bale accumulator.

In FIG. 4a, the tongue 110 of the bale stacker 100 is disposed symmetrically on the bale stacker 100 to be pulled directly behind a hitch on the baler (not shown). This provides the narrowest configuration for transport on roads, through gates, etc. In this configuration, none of the bales 400 can enter the bale stacking mechanism 200, directly. In FIG. 4b, the bale stacker 100 is shown aligned with a right-offset—that is, the tongue 110 has been shifted left—to permit two of the bales 410, 420 to enter the bale stacking mechanism 200. The bale stacker 100 can then be shifted, giving it a left-offset as shown in FIG. 4c. In this position, the bale stacking mechanism 200 is aligned to allow two more bales 430, 440 to enter it. Details of the bale accumulator are well known to those skilled in this art. A disclosure of a bale accumulator is provided by Branson in U.S. Pat. No. 5,829,238, hereby incorporated in its entirety by reference.

Figures 5, 6, 7:
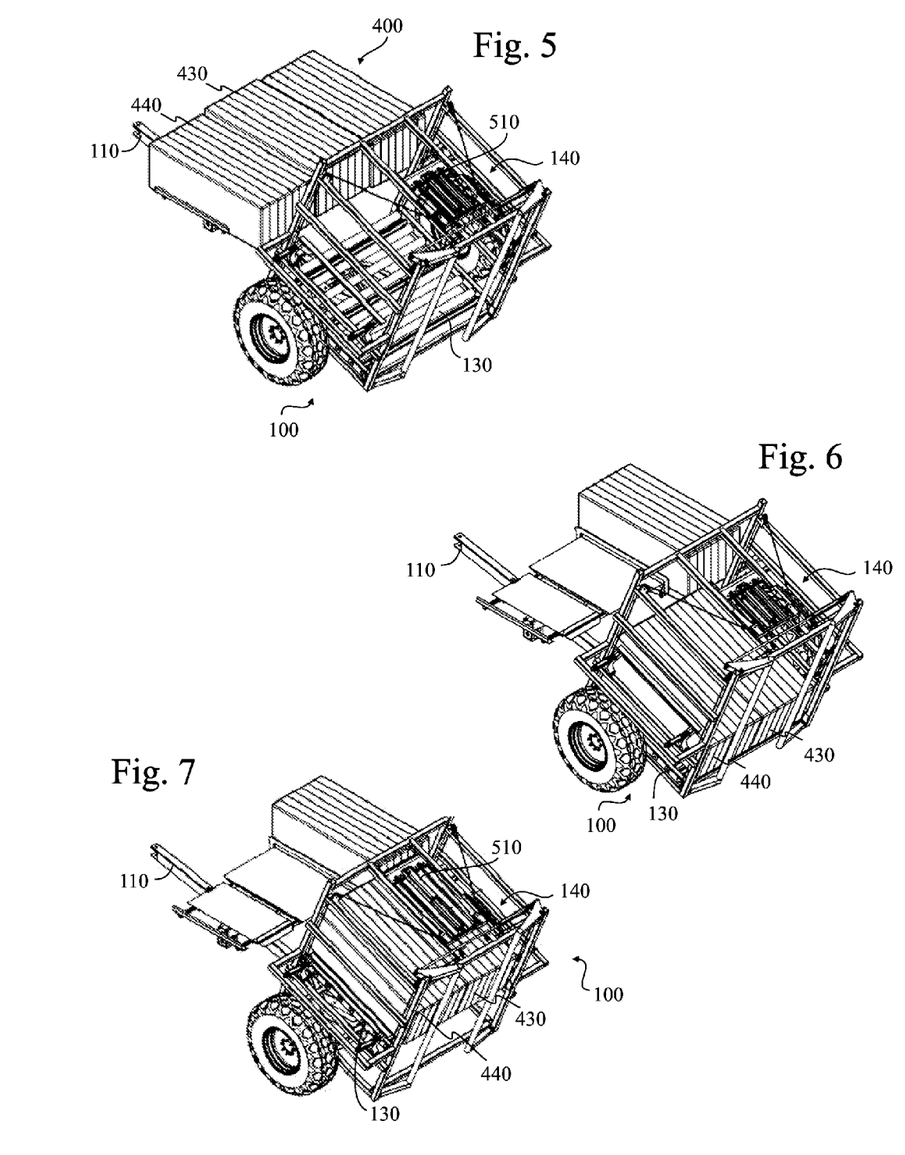
FIG. 5 shows a perspective view of an empty bale stacker prepared to receive bales from a bale accumulator containing one layer of three bales.
FIG. 6 shows a perspective view of the bale stacker, having received two of three bales from the bale accumulator.
FIGS. 7 and 8 show perspective views of the bale stacker raising two bales.

The first step in the bale stacking process is depicted in FIG. 5. The adjustable position tongue 110 is shifted right, aligning the bale stacking mechanism 200 with the two leftmost bales 430, 440 on the accumulator. The roller bed 130 is in its lowest position, as evidenced by a retracted hydraulic cylinder 510 in the cable lift mechanism 140. The bale stacking mechanism 200 has been angled back relative to the tongue 110. No bales 400 are present in the bale stacker 100.

FIG. 6 shows the bale stacker 100 receiving the two leftmost 430, 440 bales onto the roller bed 130 from the accumulator. The two bales 430, 440 are disposed in their lowest position in the bale stacker 100.

The hydraulic cylinder 510 is now extended in FIG. 7 indicating the cable lift mechanism 140 has raised the roller bed 130 and the two bales 430, 440 now residing on the roller bed 130. The first two bales 430, 440 are raised to make room for two more bales 400 beneath the first two bales 430, 440.

Figure 8:
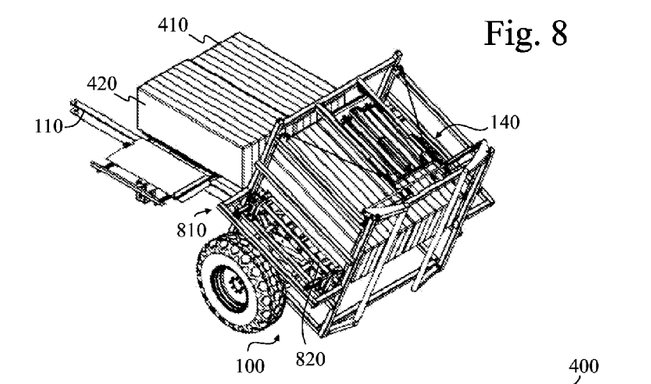

FIG. 8 depicts the bale grasping mechanism 810 gripping the now raised first bales 430, 440. The first bales 430, 440 are gripped between two bars or grippers 820. The adjustable position hitch 110 is shifted left aligning the bale stacker 100 with the two rightmost bales 410, 420 on the accumulator.

Figure 9:
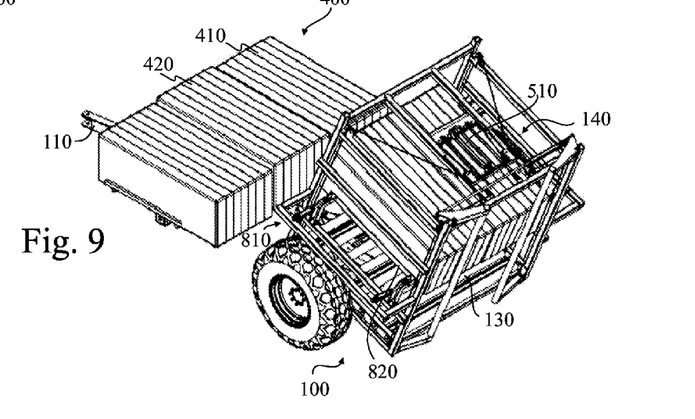
FIG. 9 shows a perspective view of the bale stacker prepared to receive two more bales from the bale accumulator, said two more bales to be disposed under two raised bales.

In FIG. 9, the cable lift mechanism 140 is shown returning the now empty roller bed 130 to its lowest position by retracting the hydraulic cylinder 510. Another bale 400 has been received on the bale accumulator.

Figure 10:
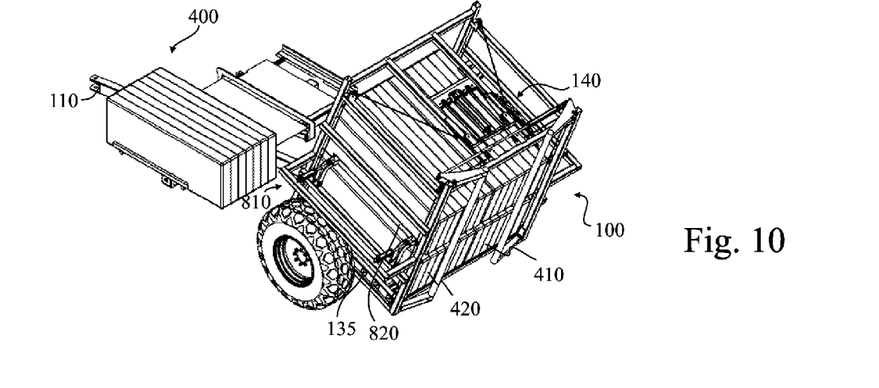
FIG. 10 shows a perspective view of the bale stacker having received two more bales from the bale accumulator, said two more bales to be disposed under two raised bales.

FIG. 10, the bale stacker 100 receives the two rightmost bales 410, 420 from the accumulator onto the roller bed 130. The second two bales 410, 420 presently reside beneath the first two bales 430, 440. A single bale 400 remains on the three-wide bale accumulator.

Figure 11:
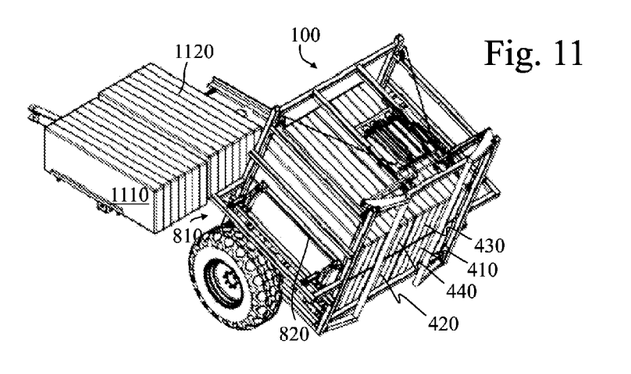
FIGS. 11 through 13 illustrate a process of raising four bales.
Figure 12:
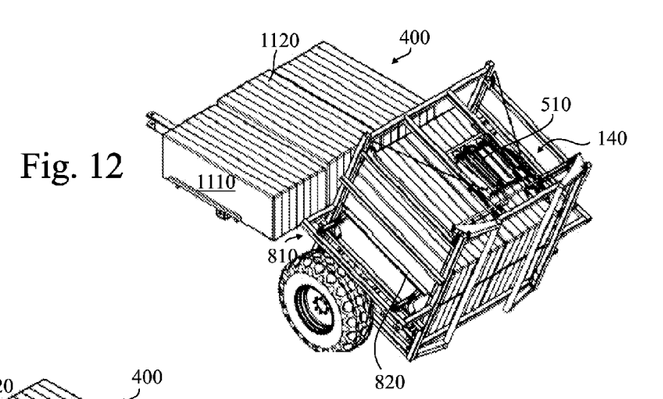

In FIGS. 11 and 12, the bale accumulator again fills, including the third two bales 1110, 1120.

Figure 13:
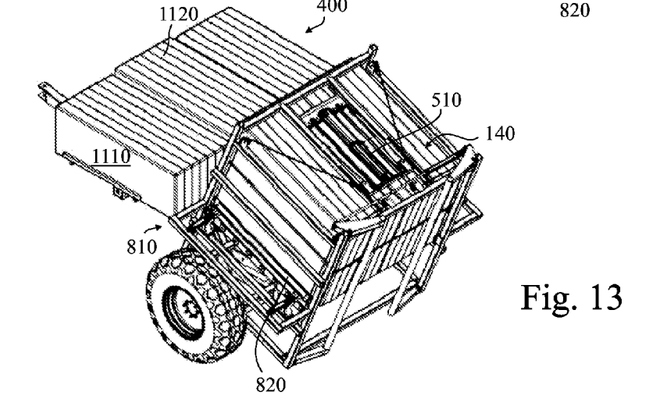

FIG. 13 shows the cable lift mechanism 140 raising the roller bed 130 and the second two bales 410, 420 now residing on the roller bed 130 until the second two bales 410, 420 touch the underside of the first two bales 430, 440, being held by the bale grasping mechanism 810. The bale grasping mechanism 810 releases the first two bales 430, 440 in its grasp. The first two bales 430, 440 are now supported by the second two bales 410, 420, which continue to lift with the cable lift mechanism 140 and the extension of the hydraulic cylinder 510. The bale stack residing on the roller bed 130 now contains four bales 400, two wide by two high.

Figure 14:
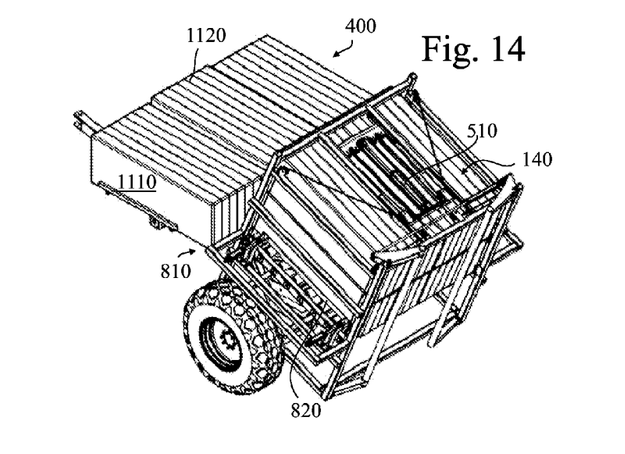
FIG. 14 shows a perspective view of the bale stacker with four bales at the top of their rise.

The bale grasping mechanism 810 now grips the second two bales 410, 420 in FIG. 14 to maintain the entire stack of bales 410, 420, 430, 440 in an elevated position, making room for additional bales 400 under the second two bales 410, 420.

Figure 15:
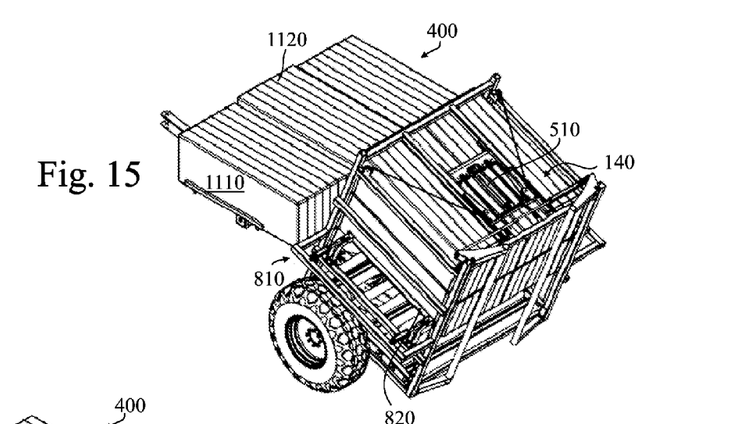
FIG. 15 shows a perspective view of the bale stacker with the four bales elevated and the roller bed being lowered to receive additional bales.
Figure 16:
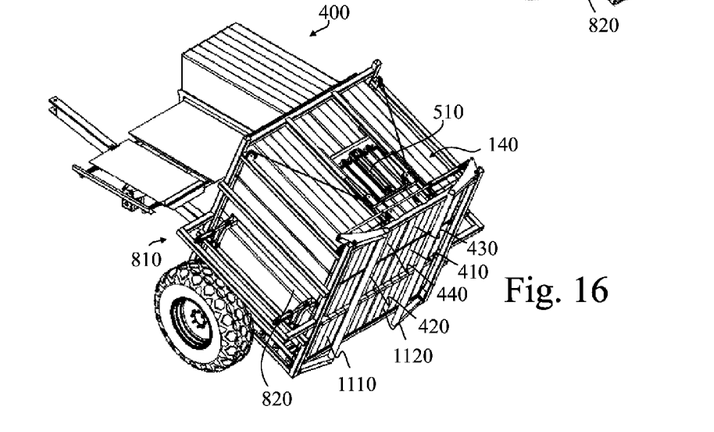
FIG. 16 shows a perspective view of the bale stacker, having received two additional bales on the roller bed.

The roller bed 130 has been returned to its lowest position in FIG. 15, preparing the bale stacker 100 to receive the third two bales 1110, 1120. The third two bales 1110, 1120 have been received into the bale stacker 100 in FIG. 16. This completes the stack for the stacker configuration shown in the figures.

Figure 17:
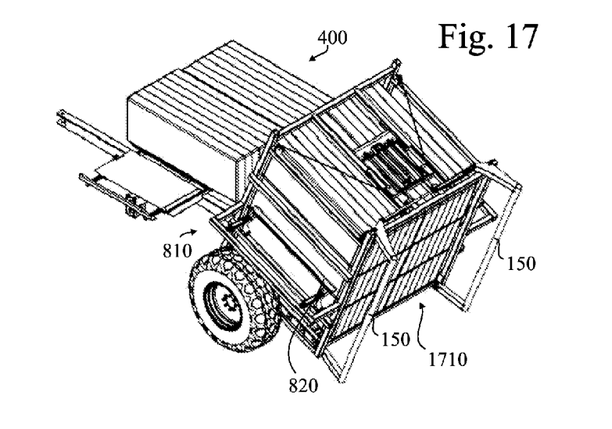
FIG. 17 shows a perspective view of the bale stacker with its rear gates open, preparing to unload its stack of six bales.
Figure 18:
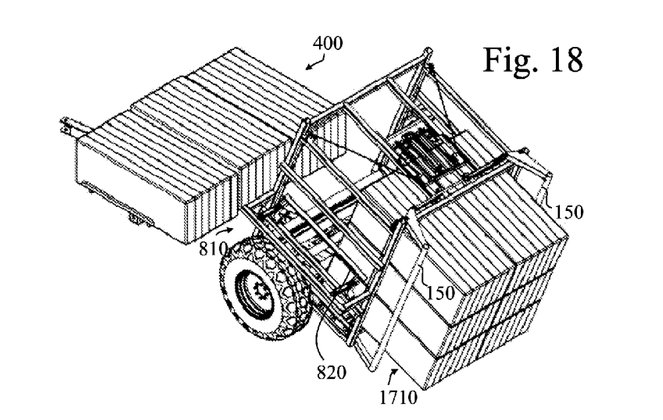
FIG. 18 shows a perspective view of the bale stacker unloading a stack of six bales.

The next step in the process is to prepare to eject the completed bale stack 1710 from the back of the bale stacker 100, as shown in FIG. 17. The hydraulic cylinders 160 for each of the two gates 150 are contracted to open the gates 150, at which time, the completed bale stack 1710 will eject, as shown in FIG. 18, under the force of gravity due to the tilt of the bale stacking mechanism 200. If the angle, θ, is insufficient at the time of the gate 150 opening, or if the bale stacker 100 is facing downhill, the angle, θ, may be increased by extending the hydraulic cylinders 210.

Figure 19:
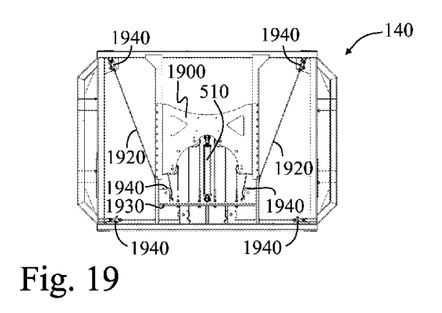
FIG. 19 is a top plan view of a cable lift mechanism, said mechanism having a roller floor at its lowest position.

FIG. 19 illustrates the cable lift mechanism 140 for the roller bed 130 in the down position. A slider 1900 is actuated by the hydraulic cylinder 510, which is retracted in this lowest roller bed 130 position. The fixed length cables 1920 are attached at one end to the roller bed 130 and at the other end to a stationary frame member 1930. Via a system of pulleys 1940, the cables are disposed downward at the corners of the bale stacker 100, as best seen in FIGS. 21 and 22.

Figure 20:
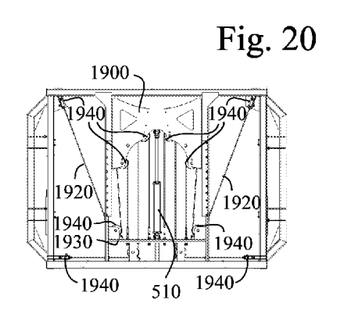
FIG. 20 is a top plan view of the cable lift mechanism, said mechanism having the roller floor at its highest position.

In FIG. 20, the cable lift mechanism 140 for the roller bed 130 is in its uppermost position. The roller bed 130 is raised as the hydraulic cylinder 510 extends, and the slider 1900 is pushed to its extreme forward position. Extending the cylinder 510 increases the distance between stationary frame member 1930 and the slider 1900. The fixed length cables 1920 move with the slider 1900 and raise the roller bed 130.

Figure 21:
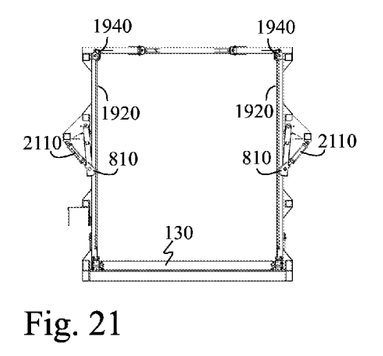
FIG. 21 is a rear elevation view of the apparatus of the present invention, detailing a gripping mechanism for grasping bales, said gripping mechanism is in its open condition.

FIG. 21 illustrates the bale grasping mechanism 810. In this figure, the bale grasping mechanism 810 is in its open position, that is, it is not gripping any bales in this position. Hydraulic cylinders 2110 are used to actuate the bale grasping mechanism 810. These hydraulic cylinders 2110 are, here, retracted so the bale grasping mechanism 810 is in its open position.

Figure 22:
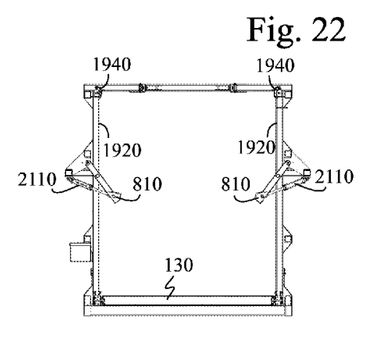
FIG. 22 is a rear elevation view of the apparatus of the present invention, showing the gripping mechanism in its closed condition, whereby bales are grasped.

In FIG. 22, the bale grasping mechanism 810 is shown in rear elevation in its closed position. In the closed position, the hydraulic cylinders 2110 are extended and a set of bales 400 may be gripped.

Figure 23:
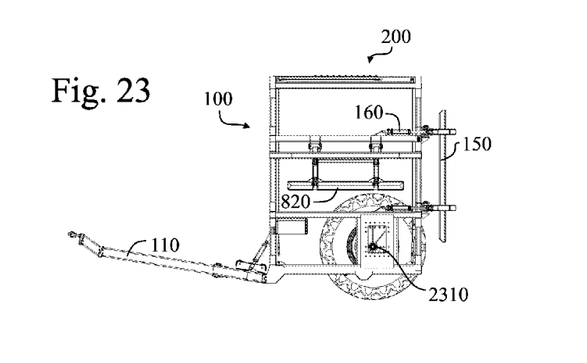
FIG. 23 is a side elevation view of the bale stacker showing an adjustable spindle.

The tongue weight may be adjusted by repositioning an adjustable spindle 2310, shown in FIG. 23. The spindle is operatively affixed to a large plate with multiple adjustment holes, permitting the spindle to be disposed in more forward or more rearward positions to alter the balance of the bale stacker 100.

All functions of the bale stacker 100 of the present invention may be automated using feedback from position sensors and a Controller Area Network (CAN) bus system. This will free up the baler operator to concentrate on controlling the baler functions.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept as expressed by the attached claims.

The invention claimed is:

1. A method of forming a stack of bales comprising:
    (a) disposing a bale stacker behind a bale accumulator, said bale accumulator receiving large square bales from a baler;
    (b) operatively, pivotally attaching a tongue to the baler;
    (c) pivoting a bale stacker mechanism on a horizontal axis, thus aligning the bale stacker mechanism with the bale accumulator;
    (d) pivoting the tongue on a vertical axis relative to the bale stacker mechanism, thus aligning the bale stacker mechanism with the first plurality of large square bales,
    (e) simultaneously receiving a first plurality of large square bales from the bale accumulator to a first elevation;
    (f) raising said first plurality of large square bales to a second elevation, said second elevation being greater than the first elevation;
    (g) grasping the first plurality of large square bales by applying a substantially horizontal force to said first plurality of large square bales with at least one grasping mechanism;
    (h) maintaining the first plurality of large square bales at the second elevation by virtue of the substantially horizontal force applied by the at least one grasping mechanism;

(i) simultaneously receiving a second plurality of large square bales from the bale accumulator to the first elevation;
(j) disposing the second plurality of large square bales directly beneath the first plurality of large square bales; and
(k) operatively disposing the first plurality of large square bales on top of the second plurality of large square bales.

2. The method of claim 1, wherein disposing a bale stacker behind a bale accumulator comprises adjusting a tongue weight by positioning a spindle forward and aft.

3. The method of claim 1 wherein simultaneously receiving the first plurality of large square bales from the bale accumulator comprises disposing the first plurality of large square bales onto a roller bed.

4. The method of claim 3 wherein the first plurality of large square bales comprises large square bales disposed adjacent to one another in a single layer.

5. The method of claim 1 wherein raising said first plurality of large square bales to a second elevation, comprises:
(a) disposing the first plurality of large square bales on a roller bed at the first elevation; and
(b) raising the roller bed on which the large square bales are disposed to the second elevation.

6. The method of claim 5 wherein maintaining the first plurality of large square bales at the second elevation comprises:
(a) grasping the first plurality of large square bales with the at least one grasping mechanism; and
(b) lowering the roller bed to the first elevation.

7. The method of claim 1 wherein the second elevation is sufficiently greater than the first elevation to allow clearance so the second plurality of large square bales may be disposed directly beneath the first plurality of large square bales without interference.

8. The method of claim 1 wherein simultaneously receiving the second plurality of large square bales from the bale accumulator to the first elevation comprises:
(a) pivoting the tongue on the vertical axis relative to the bale stacker mechanism, thus aligning the bale stacker mechanism with the second plurality of large square bales; and
(b) disposing the second plurality of large square bales on a roller bed at the first elevation.

9. The method of claim 1 wherein operatively disposing the first plurality of large square bales on top of the second plurality of large square bales comprises releasing a grasping mechanism, said grasping mechanism being used to maintain the first plurality of large square bales at the second elevation.

10. The method of claim 1 additionally comprising:
(a) raising said second plurality of large square bales to the second elevation;
(b) maintaining the second plurality of large square bales at the second elevation;
(c) simultaneously receiving a third plurality of large square bales from the bale accumulator to the first elevation;
(d) disposing the third plurality of large square bales directly beneath the second plurality of large square bales; and
(e) operatively disposing the second plurality of large square bales on top of the third plurality of large square bales.

11. The method of claim 1 additionally comprising:
(a) opening at least one gate, creating an opening; and
(b) ejecting a stack of large square bales through the opening.

12. The method of claim 1 wherein applying a substantially horizontal force to said first plurality of large square bales comprises:
(a) disposing a gripper on a side of the first plurality of large square bales; and
(b) operatively actuating the gripper to apply the substantially horizontal force to the side of the first plurality of large square bales.

13. The method of claim 12 wherein the gripper comprises a bar.

14. A method of forming a stack of bales comprising:
(a) disposing a bale stacker behind a bale accumulator, said bale accumulator receiving large square bales from a baler;
(b) simultaneously receiving a first plurality of large square bales from the bale accumulator to a first elevation;
(c) disposing the first plurality of large square bales on a roller bed at the first elevation;
(d) operatively attaching a first end of at least one cable to the roller bed;
(e) operatively engaging the at least one cable to a movable component;
(f) actuating an actuator, thus moving the movable component;
(g) pulling said at least one cable by virtue of moving the movable component;
(h) raising the roller bed and said first plurality of large square bales disposed thereon to a second elevation simultaneously with pulling the at least one cable, said second elevation being greater than the first elevation;
(i) grasping the first plurality of large square bales by applying a substantially horizontal force to said first plurality of large square bales with at least one grasping mechanism;
(j) maintaining the first plurality of large square bales at the second elevation by virtue of the substantially horizontal force applied by the at least one grasping mechanism;
(k) simultaneously receiving a second plurality of large square bales from the bale accumulator to the first elevation;
(l) disposing the second plurality of large square bales directly beneath the first plurality of large square bales; and
(m) operatively disposing the first plurality of large square bales on top of the second plurality of large square bales.

15. The method of claim 14 additionally comprising engaging the at least one cable to at least one pulley.

16. The method of claim 14 additionally comprising operatively attaching first ends of a plurality of cables to corners of the roller bed.

* * * * *